Figure 4:
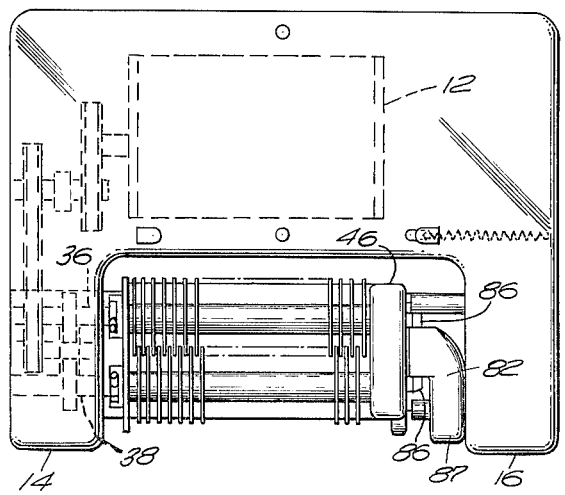

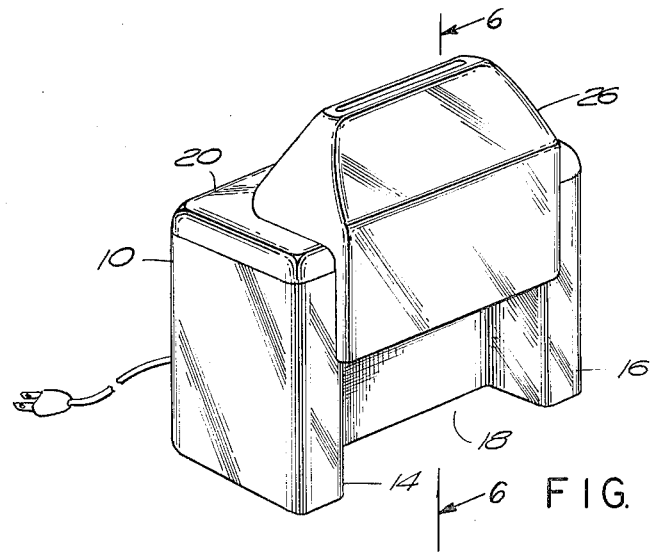
FIG. 1
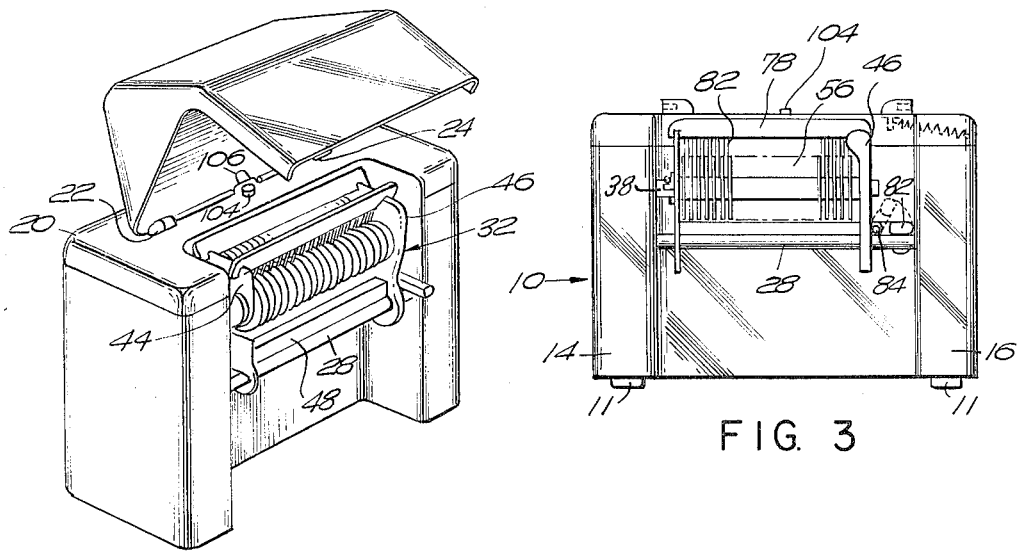
FIG. 2
FIG. 3

Dec. 14, 1965  O. R. DECKERT  3,222,712
MEAT TENDERIZING MACHINE
Filed Jan. 23, 1964  3 Sheets-Sheet 3

INVENTOR.
O. ROBERT DECKERT
BY Morse & Altman
ATTORNEYS

United States Patent Office 3,222,712
Patented Dec. 14, 1965

3,222,712
MEAT TENDERIZING MACHINE
Oscar Robert Deckert, Harvard, Mass., assignor to Sir Steak Machinery, Inc., Concord, Mass., a corporation of Massachusetts
Filed Jan. 23, 1964, Ser. No. 339,746
7 Claims. (Cl. 17—26)

This invention relates generally to meat tenderizing machines of the sort employing a pair of rotating processing rollers adapted to tenderize a piece of meat carried therebetween, and more particularly the invention is directed towards a new and improved arrangement for detachably mounting a processing head to a meat tenderizing unit.

Meat tenderizing machines of the sort that employ a pair of revolving processing rollers made up of a series of disc blades must undergo frequent cleaning in order to maintain the proper sanitary standards. When machines of this character are operated intermittently, it is necessary either to clean the cutters before they are put back into use or, alternatively, to remove the entire processing head assembly and store it temporarily in the refrigerator or other cool area to prevent decomposition of meat fibers and other meat residue which may be on the cutting elements.

Many machines of this type employ removable heads to facilitate cleaning or temporary removal to cold storage facilities. These heads are relatively heavy and, in machines heretofore available, are relatively difficult and awkward to remove since they must be uncoupled from their driving means and lifted out of their supporting housing. Furthermore, prior machines of this type have been able to perform tenderizing processes only and have been unable to perform efficiently other meat processing operations such as knitting together two pieces of meat.

Accordingly, it is a general object of the present invention to provide improvements in meat tenderizing machines.

Another object of this invention is to provide a meat tenderizing machine having a processing head assembly which may be quickly and easily removed from or replaced on the machine.

Still another object of this invention is to provide a tenderizing head assembly which may be quickly and positively locked in operating position to a driving mechanism.

A further object of this invention is to provide a meat tenderizing unit capable of selectively performing meat tenderizing functions or meat tenderiing functions simultaneously with the knitting together of two or more pieces of meat.

More particularly, this invention features a meat tenderizing machine in which a processing head assembly is detachably connected to a housing having a pair of spaced horizontal support rods. The connection is made by means of shoulders formed in the head assembly frame and adapted to engage one side of one of the rods. A latch member hinged to the head assembly engages the opposite side of the bar and also a wall of the housing when in locking position to provide lateral and a longitudinal locking of the assembly. As another feature of this invention, the head assembly is provided with stripping combs which may be set in different operating positions to produce different meat processing operations. As a further feature of this invention, the tenderizing head assembly is mounted so as to be swung horizontally in and out of operating position with respect to the housing.

Figure 5:
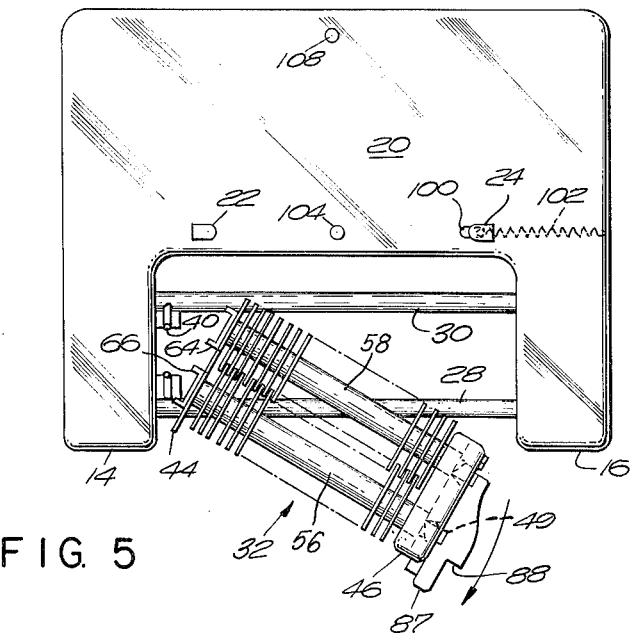
Figure 6:
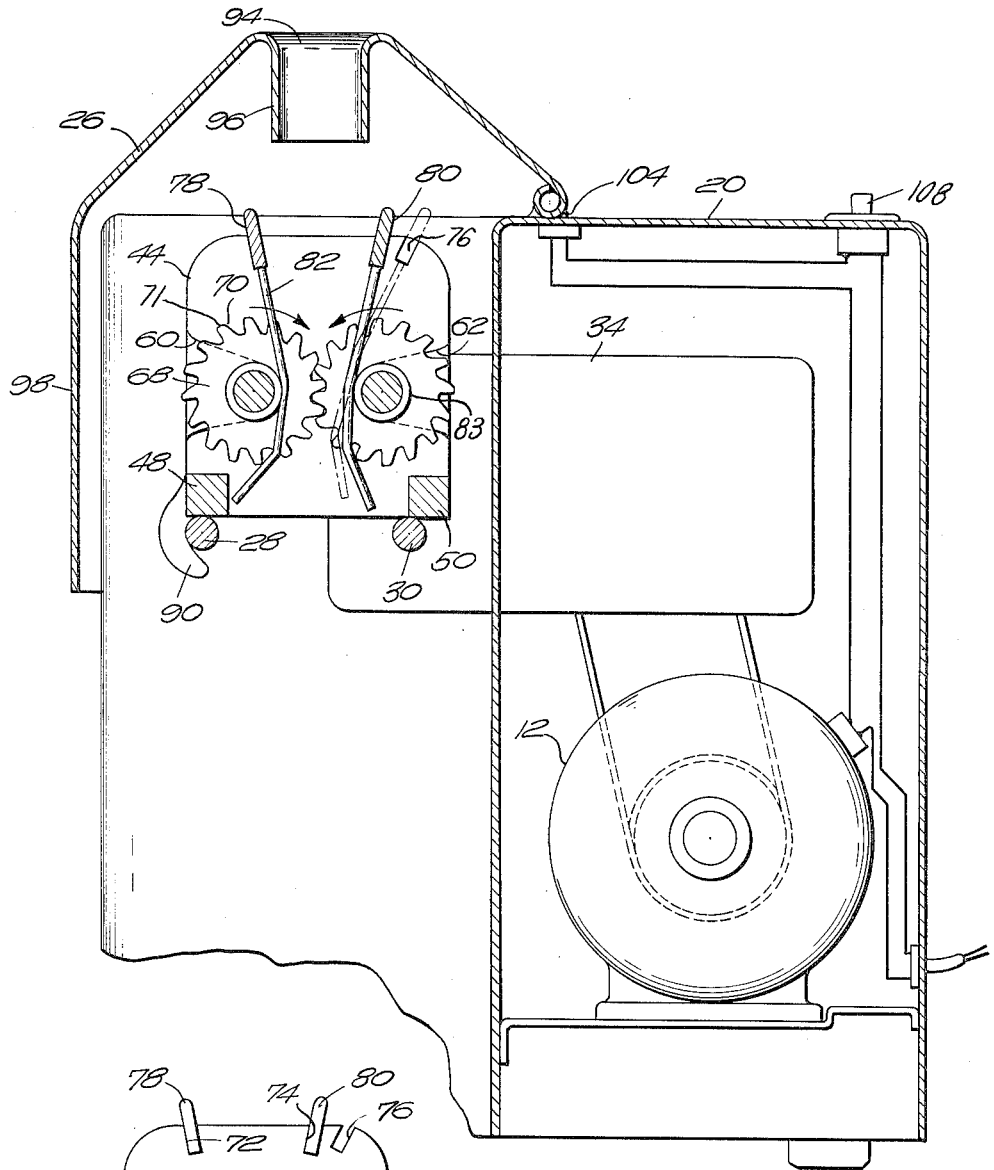
Figure 7:
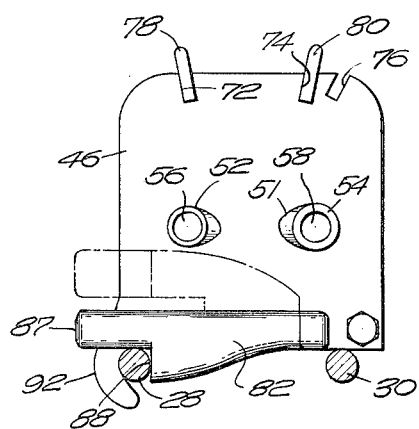

But these and other features of the invention, along with further objects and advantages thereof, will become more fully apparent from the following detailed description of a preferred embodiment of the invention with reference being made to the accompanying drawings, in which:

FIG. 1 is a view in perspective of a meat tenderizing machine made according to the invention, FIG. 2 is a view similar to FIG. 1 but with the cover raised to show the processing head, FIG. 3 is a view in front elevation of the machine with the cover removed, FIG. 4 is a top plan view of the machine with the cover removed, FIG. 5 is a view similar to FIG. 4 showing the head assembly partly removed, FIG. 6 is a cross-sectional view taken along the line 6—6 of FIG. 1 and on an enlarged scale, and, FIG. 7 is an end elevation of the head assembly.

Referring now to the drawings the meat tenderizing machine generally comprises a housing 10 supported on rubber feet 11 and fabricated from sheet stainless steel or the like. The housing is characterized by a boxed rearward portion, for enclosing a motor 12 (FIG. 4), and a pair of forwardly extending side portions 14 and 16 which define a relatively wide vertical recess or passage 18 in the front portion of the housing 10. A top cover member 20, also of stainless steel, forms part of the housing 10 and is provided with hinges 22 and 24 for mounting a hood 26.

Extending horizontally between the side portions 14 and 16 are spaced parallel rods 28 and 30 rigidly mounted at their ends to the vertical opposing walls of the housing. The rods 28 and 30 function to maintain the proper spaced relation between the opposing walls of the side portions 14 and 16 and also as a support for a processing head assembly 32 detachably mounted thereon. The head assembly, when in operating position, is located in the upper portion of the recess 18 between the side portions 14 and 16 and is enclosed by the hood 26 when the hood is in the lowered position of FIG. 1. Access to the head assembly 32 is gained by lifting the hood 26 as suggested in FIG. 2.

Mounted within the housing 10 and in driving engagement with the motor 12 is a reduction gear assembly 34. The reduction gear extends into the side portion 14 and includes a pair of counter-rotating stub shafts 36 and 38 which extend out through a side wall of the housing in spaced parallel relation to one another and are located above the rods 28 and 30. Each of the stub shafts is provided with radially extending pins 40 adapted for driving engagement with the head assembly 32 as will presently appear.

The head assembly 32 is generally organized about a frame comprising a pair of upright end plates 44 and 46 rigidly connected to one another at their lower edges by means of spaced brackets 48 and 50. The end plate 46 is formed with a pair of openings 49 and 51 to accommodate bearings 52 and 54 which rotatably support drive shafts 56 and 58 for a pair of wringer-like processing rollers which extend in spaced parallel relation between the two end plates. The end plate 44 is formed with re-entrant openings 60 and 62 in opposing edges thereof and in registered opposition to the openings formed in the end plate 46. The re-entrant openings 60 and 62 accommodate hubs 64 mounted fast to the drive shafts 56 and 58. The arrangement is such that the drive shafts may be conveniently disconnected from the supporting frame by merely swinging the driven ends of the shafts from their re-entrant openings in the plate 44 and withdrawing the opposite ends, together with their bearings 52 and 54, from the openings 49 and 51. These openings are enlarged on the latch side of the end plate 46 at their oppositely facing sides to permit the shafts to be swung through an arc sufficient for disengagement. As best shown in FIG. 5 each of the hubs 64 is formed with a pair of lugs 66 for driving engagement with the pins 40 extending from the stub shafts 36 and 38.

Each of the processing roller drive shafts has mounted thereon a plurality of disc cutter blades 68 which are made up with a series of teeth 70 formed with a sharp razor-like arcuate edge 71. The cutter discs of one processing roller are in staggered relation with the cutter discs of the other roller and the teeth of the respective discs overlap. Thus, when meat is fed between the wringer-like processing rollers, the cutter blades engage and support the meat without crushing it but cut into the body of the meat with a rotary cutting action as the meat passes between the teeth of the processing rollers.

Formed in the upper edges of the end plates are sets of slots arranged in pairs with one pair of slots 72 formed towards the front of the end plates and two pairs of slots 74 and 76 disposed towards the rearward portion thereof. The slots provide a convenient means for mounting a pair of stripping combs 78 and 80 to the head assembly. In practice, the forward stripping comb 78 is mounted in one set position whereas the rearward comb 80 may be set in either of two operating positions for reasons that will presently appear. Each of the combs is formed with a top bar from which depend a number of bent tines 82 which extend between each of the disc cutting blades 68 and normally rest against spacers 83 mounted between the blades and along the drive shafts 56 and 58 respectively. The main function of the stripper combs is to strip the meat from the cutting blades as it discharges from between the processing rollers. It will be understood that without the stripping combs the meat would tend to wrap around the processing rollers by reason of the frictional and intermeshing engagement between the meat and the blades. In normal operation the stripping combs will be set in the manner shown in full line in FIG. 6, that is to say with the rearward stripping comb 80 located in the pair of slots 74 so that the tines of each comb are set in corresponding angular positions with respect to their respective processing rollers. A piece of meat fed between the processing rollers with the combs in the FIG. 6 position will tenderize the meat evenly on both sides and each of the processing rollers will disengage with the meat at the same time on either side.

However, when the comb 80 is set in the dotted line position of FIG. 6, a different processing action may be obtained. With the comb in the slot 76, two pieces of meat may be fed together between the processing rollers and will be discharged from the bottom with the two pieces intimately knitted together. This result is due to the fact that the change in angle of the comb 80 causes the rearward or right-hand processing roller to disengage from the meat in advance of the forward or left-hand processing roller as viewed in FIG. 6. The cutting teeth of the left-hand roller thus disengaging last from the meat pull the fibers from the rearward piece of meat forwardly into union with the fibers of the forward piece of meat causing the two pieces to knit together to form a single piece.

By varying the set of the combs, it is also possible to vary the thickness of the meat which is passed through the rollers. By setting the tines of one comb closer to the tines of the other, the meat may be compressed or alternatively by spreading the tines apart, the processed meat will be thicker although less dense. The machine may be easily converted from purely tenderizing operations to tenderizing plus knitting by merely moving the comb 80 from the slots 74 to the slots 76 as desired.

Hinged to the end plate 46 on the right-hand side of the head assembly is a latch 82. The latch is pivoted by pin 84 to a pair of bosses 86 formed on the lower edge of the end plate 46. The latch 82 has a forwardly extending finger 87 and a shoulder or abutment 88 formed in the bottom side thereof. The outer edge of the latch is curved and so dimensioned that the outermost edge thereof, when in the lowered locking position of FIGS. 3 and 4, will butt against the vertical inner wall of the right-hand side portion 16 of the housing. The latch, when lowered into the locking position thus forces the head assembly to the left to insure positive driving engagement between the pins of the stub shaft and the lugs on the drive shafts described above.

The function of the shoulder 88 as best shown in FIG. 7 is to engage the rearward edge of the rod 28 to lock the head assembly against forward movement. The end plates 44 and 46 are both formed with depending abutments or hook portions 90 and 92 for engaging the front edge of the rod 28 and to position the head assembly rearwardly. Thus by merely lifting the latch 82 into the raised position shown in FIG. 5 and in outline in FIGS. 3 and 7 the head assembly may be easily removed from the housing. Once the latch is raised it is necessary only to move the head assembly a half inch or so to the right so as to disengage lugs from the pins and then swing the head forwardly as suggested in FIG. 5. No lifting of the head is required to uncouple the head since all connecting and disconnecting movements are carried out in a horizontal plane with the head being supported primarily by the rods 28 and 30 so that it may be easily slid outwardly from the housing. In this connection it will be noted that the lower edges of both of the end plates 44 and 46 are horizontally straight rearwardly of the hook portions so that a smooth swinging movement of the head is obtained when the head is being either connected or disconnected from the housing.

The hood 26 as shown in FIGS. 1, 2 and 6 has a relatively high domed portion in the top of which is formed a slotted opening 94 and directly over the processing rollers of the head assembly and into which the meat is dropped. A funnel 96 may be provided around the marginal edge of the opening 94 in order to guide the piece of meat into the bite of the processing rollers. The forward portion of the hood 26 is provided with a front skirt piece 98 which extends down below the lower reach of the head assembly as a protection against accidental contact with the head assembly by an operator when the machine is running. In practice the top of the hood is raised sufficiently above the processing rollers that the operator's fingers could not reach down to the cutting blades should his hand be inserted into the opening 94 for any reason.

For the convenient removal of the hood from the housing the hinge 24 is mounted in a slot 100 and urged normally to the right by means of a spring 102. The hood may be easily removed by merely raising it and shifting the hood to the left far enough to disengage the left-hand hinge, which is fixed, and then moving the hood back again to the right far enough to disengage it from the movable hinge 24.

As a safety measure, a cut-out switch 104 is located on the cover of the housing directly opposite a boss 106 formed integral with the hood 26. The switch is a normally open switch and is closed when the hood 26 is in the closed position. When the hood is raised as in FIG. 2 the switch 104 will open to stop the motor 12. This safety measure prevents operation of the machine without the safety hood in its operating position. A main control switch 108 is located on the cover 20 in series with the switch 104.

While the invention has been described with particular reference to the illustrated embodiment, it will be understood that numerous modifications thereto will appear to those skilled in the art. It will also be understood that the above description and accompanying drawings should be taken as illustrative of the invention and not in a limiting sense.

Having thus described my invention, what I claim and desire to obtain by Letters Patent of the United States is:

1. A meat tenderizing machine, comprising a housing, said housing being formed with a pair of spaced vertical walls defining a passage, a pair of spaced parallel rods extending horizontally across said passage between said walls, power driven rotary coupling means extending through one of said walls, a processing head assembly mounted on said rods, said head including a frame, a pair of spaced parallel processing rollers rotatably mounted to said frame, connecting means mounted on one pair of ends of said rollers for cooperative driving engagement with said coupling means, said frame being formed with at least one depending abutment to engage the front edge of the foremost rod and a latch movably mounted at the end of said frame opposite the drive connection end, said latch having a shoulder portion for engagement with the rearward edge of the foremost rod when said latch is in locking position, the outer edge of said latch being adapted to bear against the other of said walls to hold said connecting means in driving engagement with said coupling means.

2. A meat tenderizing machine according to claim 1 including a pair of stripping combs the tines of which extend downwardly between said rollers and means for mounting at least one of said combs to said frame in one of a plurality of positions to selectively vary the angular set of said tines with respect to said rollers.

3. A meat tenderizing machine according to claim 1 wherein the lower surfaces of said frame are horizontally straight rearwardly of said abutment to permit said frame to be slid over said rods when said latch is in an unlocked position.

4. A meat tenderizing machine, comprising a motor, a housing enclosing said motor, said housing being formed with a pair of spaced vertical walls defining a passage, a pair of spaced parallel rods extending horizontally across said passage between said walls, rotary coupling means driven by said motor and extending through one of said walls, a tenderizing head removably mounted on said rods, said head including a frame, a pair of spaced parallel processing rollers rotatably mounted to said frame, quick connecting means mounted on one pair of ends of said rollers for cooperative driving engagement with said coupling means, said frame being formed with a pair of spaced depending abutments to engage the front edge of the foremost rod and a latch pivotally mounted at the end of said frame opposite the drive connection end, said latch having a shoulder portion, said latch in one position bearing against the other of said walls to hold said quick connecting means in driving engagement with said coupling means and to position said shoulder portion to the rear edge of said foremost rod for locking said frame to said rods, and in another position unlocking said frame permitting removal of said head from said housing.

5. A tenderizing machine, comprising a housing, said housing being formed with a pair of spaced vertical walls defining a passage, support means extending horizontally across said passage between said walls, power driven rotary coupling means extending through one of said walls, a processing head assembly mounted on said support means, said head including a frame, a pair of spaced parallel processing rollers rotatably mounted to said frame, connecting means mounted on one pair of ends of said rollers for cooperative driving engagement with said coupling means and a latch movably mounted between the end of said frame opposite the drive connection end and the other of said walls, said latch in one position bearing against said frame and the other of said walls to hold said connecting means in driving engagement with said coupling means and in another position unlocking said frame permitting removal of said head from said housing.

6. A meat tenderizing machine according to claim 5 wherein said latch is hinged to said frame and is formed with a curved outer edge for pivoting said latch into and out of engagement with said other wall.

7. A meat tenderizing machine according to claim 1 wherein said abutment is in the form of a hook adapted to engage both the front and the lower edges of the foremost rod to prevent rearward and upward displacement of said frame.

References Cited by the Examiner
UNITED STATES PATENTS
2,704,858  3/1955  Deckert _____ 17—26

SAMUEL KOREN, *Primary Examiner.*

LUCIE H. LAUDENSLAGER, *Examiner.*